(12) United States Patent
Lee et al.

(10) Patent No.: US 12,168,367 B2
(45) Date of Patent: Dec. 17, 2024

(54) AUTOMOTIVE WHEEL EQUIPPED WITH RESONATOR MODULE HAVING IMPROVED FASTENING FORCE

(71) Applicant: Hyundai Sungwoo Casting Co., Ltd., Seoul (KR)

(72) Inventors: Jong Ju Lee, Chungju-si (KR); Dong Hyoung Lee, Chungju-si (KR); Sang Bum Park, Chungju-si (KR); Seong Hun Choi, Chungju-si (KR); Hee Chan An, Chungju-si (KR)

(73) Assignee: Hyundai Sungwoo Casting Co., Ltd., Seoul (KR)

( * ) Notice: Subject to any disclaimer, the term of this patent is extended or adjusted under 35 U.S.C. 154(b) by 398 days.

(21) Appl. No.: 17/592,526

(22) Filed: Feb. 4, 2022

(65) Prior Publication Data

US 2022/0266628 A1    Aug. 25, 2022

(30) Foreign Application Priority Data

Feb. 19, 2021 (KR) .................. 10-2021-0022283

(51) Int. Cl.
*B60B 21/12* (2006.01)
(52) U.S. Cl.
CPC ........ *B60B 21/12* (2013.01); *B60B 2900/133* (2013.01)

(58) Field of Classification Search
CPC .................. B60B 21/02; B60B 2900/133
See application file for complete search history.

(56) References Cited

U.S. PATENT DOCUMENTS

| 7,040,365 | B2 * | 5/2006 | Lust ........................ B60B 21/04 |
| | | | 152/516 |
| 2018/0029425 | A1 * | 2/2018 | Nourzad ............... B60C 19/002 |
| 2019/0016279 | A1 * | 1/2019 | Lee ........................ B23K 20/10 |

FOREIGN PATENT DOCUMENTS

| JP | 6227705 B2 | | 11/2017 | |
| KR | 20130031117 | * | 3/2013 | |
| KR | 20180045602 A | * | 5/2018 | |
| WO | WO-2019151622 A1 | * | 8/2019 | ........... B60B 21/026 |

* cited by examiner

*Primary Examiner* — Scott A Browne
(74) *Attorney, Agent, or Firm* — Revolution IP, PLLC

(57) ABSTRACT

The present disclosure relates to an automotive wheel equipped with a resonator module having an improved fastening force and, more particularly, to an automotive wheel equipped with a resonator module having an improved fastening force, the automotive wheel having a first accommodation groove spaced a predetermined distance inward from both sides of the resonator module and being able to accommodate a fastening band therein so that a fastening force between a rim and the resonator module can be improved, and having a second accommodation groove engraved from the bottom of the first accommodation groove to be able to accommodate a stopper of the fastening band.

7 Claims, 5 Drawing Sheets

AUTOMOTIVE WHEEL EQUIPPED WITH RESONATOR MODULE HAVING IMPROVED FASTENING FORCE

CROSS-REFERENCE TO RELATED APPLICATION

This application claims under 35 U.S.C. § 119(a) the benefit of Korean Patent Application No. 10-2021-0022283 filed on Feb. 19, 2021, the entire contents of which are incorporated herein by reference.

BACKGROUND

(a) Technical Field

The present disclosure relates to an automotive wheel equipped with a resonator module having an improved fastening force and, more particularly, to an automotive wheel equipped with a resonator module having an improved fastening force, the automotive wheel having a first accommodation groove spaced a predetermined distance inward from both sides of the resonator module and being able to accommodate a fastening band therein so that a fastening force between a rim and the resonator module can be improved, and having a second accommodation groove engraved from the bottom of the first accommodation groove to be able to accommodate a stopper of the fastening band.

(b) Background Art

Description of this section only provides the background information of the present disclosure without configuring the related art.

In general, noise is generated by various reasons and transmitted to the interior of vehicles. The largest factor of the noise is road surface noise that is generated from a road surface and the road surface noise is classified into road surface noise, booming sound, rumble sound, etc.

Such road surface noise is generated in most case through the ground, tires, wheels, suspensions, etc. Further, such road surface noise causes a drive to feel considerably unpleasant, so methods for reducing the road surface noise are being continuously studied.

In order to reduce noise, a resonance type noise reduction module that removes noise by measuring a specific wavelength band of noise and offsetting noise at the wavelength band is generally used for automotive wheels.

Meanwhile, an automotive wheel requires a component for coupling and fixing such a resonator module to the automotive wheel.

In the related art, a resonator module and a rim of an automotive wheel (Japanese Patent No. 6227705) are fastened by coupling a fixing portion disposed on a side of the resonator module and a fixing groove disposed on a side of the rim to each other.

However, such a method of fastening a resonator module and a rim to each other in the related art has a problem that an additional process of coupling the fixing portion and the fixing groove is required after injection molding or manufacturing of parts, so the manufacturing cost increases.

Further, there is a need for a process of adjusting the positions of the fixing portion and the fixing groove and then fastening the fixing portion and the fixing groove, so the existing manufacturing line of automotive wheels should be additionally changed.

Further, there is another problem that when the bottom of a resonance space is open and directly exposed to the surface of the rim, it is difficult to prevent the resonator module from coming off the rim due to wind pressure, which is generated by rotation of the automotive wheel, only by coupling the fixing portion and the fixing groove, so the effect of offsetting a resonance sound may decrease.

Accordingly, there is a continuous need for an automotive wheel having a self-fastening component for enabling a resonator module to be fastened by itself to a rim.

In order to solve the problems of automotive wheels of the related art, there are cases of studying a wheel having a fastening component by some domestic and foreign relevant companies. However, it takes a lot of money to make a wheel structure having an additional fastening component as an actual product, or if not, the effect of increasing a fastening force with respect to the manufacturing cost of the device is not high, so the market competitiveness is deteriorated in comparison to existing automotive wheels, so there is no case of actual using.

Accordingly, as described above, it is required to develop a device that can solve the problems of the related art.

SUMMARY OF THE DISCLOSURE

The present disclosure has been made in an effort to remove the defects of the related art described above and objectives of the present disclosure are as follows.

First, the present disclosure provides an automotive wheel in which the fastening force of a rim and a resonator module is primarily improved by including a first accommodation groove and a second accommodation groove that can accommodate an additional fastening component such as a fastening band in addition to a self-fastening component of the resonator module.

Second, the present disclosure provides an automotive wheel in which the fastening force of a rim and a resonator module is secondarily improved because the height gradually increases outward from the inside of a first accommodation groove and a fastening band accommodated in the first accommodation groove is pressed downward toward the outer side of the resonator module.

The objectives of the present disclosure are not limited to the objects described above and other objects will be clearly understood by those skilled in the art from the following description.

According to one aspect of the present disclosure, there is provided an automotive wheel equipped with resonator module having improved fastening force, the automotive wheel including: a spoke; a rim connected to the edge of the spoke; and a resonance module including a rim contact portion provided to surround an outer edge of the rim and a resonance portion formed to surround at least a portion of the rim contact portion and forming a resonance space between the rim contact portion and the resonance portion.

In this case, the resonance module may include a first accommodation groove spaced a predetermined distance inward from both sides of the resonance module and being able to accommodate a fastening band therein so that a fastening force between the rim and the resonance module can be improved.

Further, the resonance module may include anti-separation guiders disposed between both sides of the resonance module and the first accommodation groove and protruding from a top of the resonance module to be able to prevent the fastening band from separating from the resonance module.

In addition, at least any one of the anti-separation guiders disposed on both sides of the resonance module may include a spacer that provides a space, which enables the fastening band inserted in the first accommodation groove to be taken out and replaced, by securing a spare space.

Meanwhile, the resonance module may include a second accommodation groove engraved from a bottom of the first accommodation groove to be able to accommodate a stopper of the fastening band.

According to another aspect of the present disclosure, the height of the first accommodation groove may gradually increase outward from the inside thereof so that the fastening band presses down the resonance module outward, thereby being able to improve the fastening force between the resonance module and the rim.

In this case, the spacer and the second accommodation groove may be continuously disposed on the same line on the width-directional axis of the resonance module.

In addition, the automotive wheel may include a lightweight portion bored on a side of the resonance module to reduce the weight of the resonance module.

Furthermore, the automotive wheel may include a coupling portion disposed at an end of the resonance module so that a plurality of resonance modules can be coupled and fixed.

Additional configurations of the present disclosure will be partially described below and may be partially and easily known from the description or may be understood by embodiments of the present disclosure.

The above general description and the following detailed description are both provided only as examples without limiting the present disclosure described in claims.

The effects of the present disclosure having the configuration described above are as follows.

First, the fastening force between the rim and the resonator module can be primarily improved by including a first accommodation groove and a second accommodation groove that can accommodate an additional fastening configuration such as a fastening band in addition to a self-fastening configuration of the resonator module.

Second, the fastening force between the rim and the resonator module can be secondarily improved because the height gradually increases outward from the inside of a first accommodation groove and a fastening band accommodated in the first accommodation groove is pressed downward toward the outer side of the resonator module.

The effects of the present disclosure are not limited to those described above and other effects not stated herein may be made apparent to those skilled in the art from claims.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION

Figure 1:
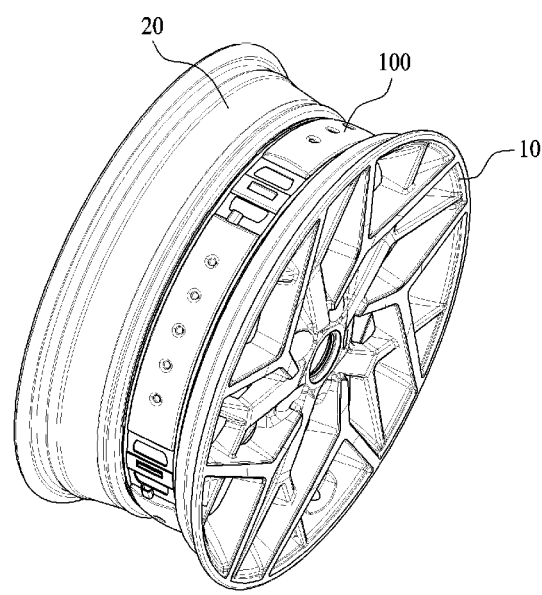
FIG. 1 is a perspective view of an automotive wheel according to an embodiment of the present disclosure.

Detailed embodiments of the present disclosure are described hereafter in detail with reference to the accompanying drawings.

However, in the following description of a detailed embodiment of the present disclosure, detailed descriptions of well-known functions or configurations relating to the present disclosure will not be provided so as not to obscure the description of the present disclosure with unnecessary details.

The objectives, features, and advantages of the present disclosure will be made clearer through the following detailed description related to the accompanying drawings. However, the present disclosure may be modified in various ways and implemented by various exemplary embodiments, so that specific exemplary embodiments are shown in the drawings and will be described in detail.

Detailed descriptions of well-known functions or configurations relating to the present disclosure will not be provided so as not to unnecessarily obscure the description of the present disclosure. Further, the numbers used in the description of the present disclosure are only discriminators for discriminating one component from another component.

In addition, the term "unit" used to indicate a component in the following description is only used to easily make the specification without having a specific meaning or function.

FIG. 1 is a perspective view of an automotive wheel according to an embodiment of the present disclosure.

Figure 2:
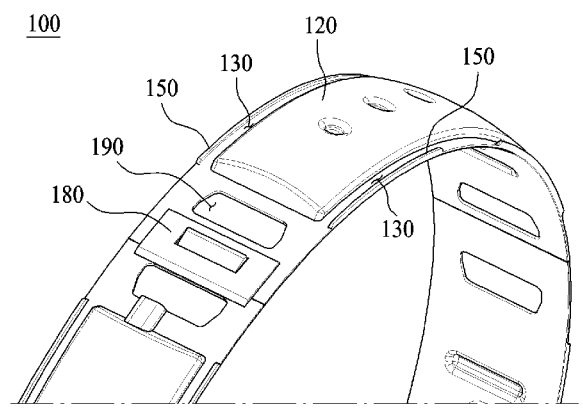
FIG. 2 is a detailed view of a resonator module according to the present disclosure.

FIG. 2 is a detailed view of a resonator module 100 according to the present disclosure.

An automotive wheel according to an embodiment of the present disclosure may include a spoke 10, a rim 20, and a resonator module 100.

The spoke 10 may include an edge and a plurality of supports radially extending from the center of the spoke 10 to the edge.

In this embodiment, the supports are disposed adjacent to each other with regular intervals, and the number and the gap of the supports are not limited. That is, the supports may have a predetermined thickness and an appropriate number of supports may be disposed in consideration of the entire circumference of the automotive wheel.

The rim 20 is formed entirely in a cylindrical shape and is connected to the edge of the spoke 10 so that a tire can be coupled. It should be noted that the rim 20 may also be formed in various shapes without limitation.

The general configuration of the spoke 10 and the rim 20 is apparent to those skilled in the art, so they are not described in more detail.

The resonator module 100 is disposed to entirely surround the outer edge of the rim 20 and absorbs a resonance sound that is generated when a vehicle is driven.

In detail, the resonator module 100, in this embodiment, may include a rim contact portion provided to surround the outer edge of the rim 20, and a resonance portion 120 formed to surround at least a portion of the rim contact portion and forming a resonance space between the rim contact portion and the resonance portion.

That is, the rim contact portion is longitudinally elongated, thereby forming the bottom of the resonator module 100. Further, the resonance portion 120 is connected in the longitudinal direction of the rim contact portion, thereby forming the resonance space.

In particular, in this embodiment, the entire length of the rim contact portion corresponds to the circumference of the rim 20 and a plurality of resonance portions 120 is provided in the longitudinal direction. Although a total of four resonance portions 120 are provided in this embodiment, the number is not limited to this embodiment and more or less resonance portions may be provided.

The resonance space is entirely closed and a resonance neck partially protruding to communicate with the resonance space may be formed at a predetermined position on the resonance portion 120. Accordingly, the resonator module 100 of the present disclosure has the structure of Helmholtz Resonator by the resonance space and the resonance neck protruding from an end of the resonance space, thereby absorbing a resonance sound in a predetermined frequency range generated between a road surface and the wheel.

In this case, it is preferable that the height of the resonance neck is the same as the height of the resonance portion 120 and the width of the resonance neck is smaller than the width of the resonance portion 120. Further, it is preferable that the resonance neck is formed by extending at least any one of ends of the resonance portion 120 to the center between adjacent resonance portions 120. However, it should be noted that the present disclosure is not limited thereto and the resonance neck may be formed in various ways.

The principle of Helmholtz Resonator is well known to those skilled in the art, so relevant detailed description is not provided.

The resonance module 100 may be made of various fiber materials such as a synthetic fiber, a natural fiber, a carbon fiber, or the like, and in detail, the resonance module 100 is made of Polypropylene (PP) in this embodiment.

The resonance module 100 may include a light-weight portion 190 bored on a side of the resonance module 100 to reduce the weight of the resonance module 100.

PP, which is a propylene polymer, is one of most light plastics, has a specific weight of 0.82 to 0.92, is excellent in a stress crush characteristic, transparence, anti-tension, etc. in comparison to PE although the entire properties are similar to those of PE, is slightly light and has high thermal resistance in comparison to PE, has high hinge ability, is not cut even if it is repeatedly folded and unfolded, has high electrical characteristic, is not harmful, is strong against acid, alkali, salt water, alcohol, gasoline, and oil, and has high stress cracking characteristic in comparison to PE, so it is advantageous in terms of light-weighting and productivity of the resonance module 100, whereby the manufacturing cost and production cost can be minimized.

Further, the resonance module may include a coupling portion 180 disposed at an end of the resonance module 100 so that a plurality of resonance modules 100 can be coupled and fixed.

As for the coupling portion 180, as shown in FIG. 2, a first side of one resonance module 100 and a second side of another resonance module 100 can be coupled to each other by a hook-type fastener. Further, any one of ultrasonic melding, thermal melting, or vibration melting may be selectively performed on the surface of the coupling portion 180 and an adhesive/gluing agent may be applied to further improve the fastening force. These methods may be independently or simultaneously performed and the coupling portions 180 may include other well-known coupling components other than the coupling component described above.

Figure 3:
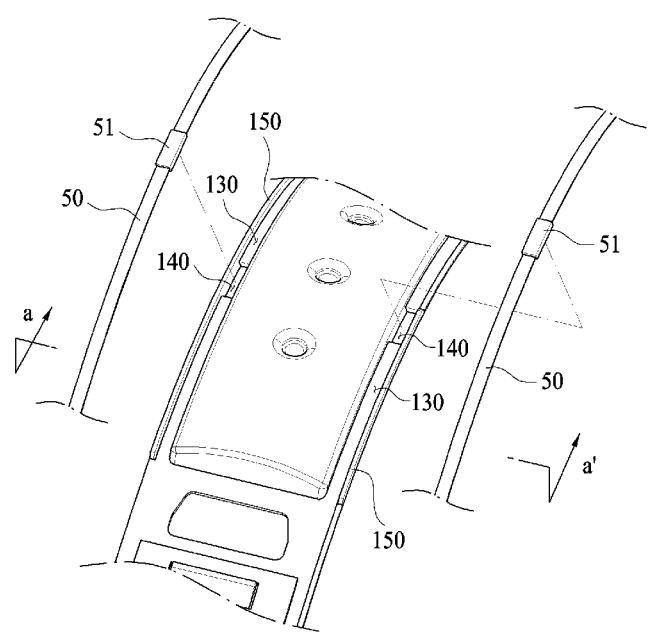
FIGS. 3, 4A and 4B are a detailed view and a cross-sectional view of a first fastening groove according to an embodiment of the present disclosure.
Figure 4A:
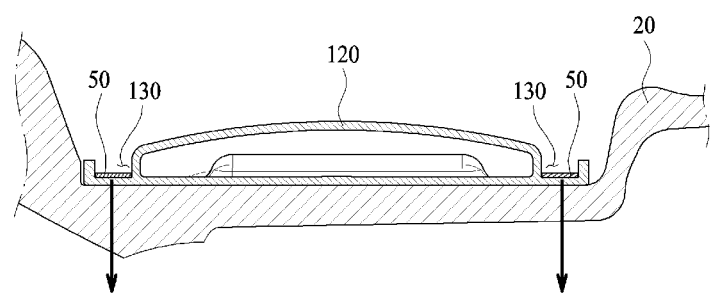
Figure 4B:
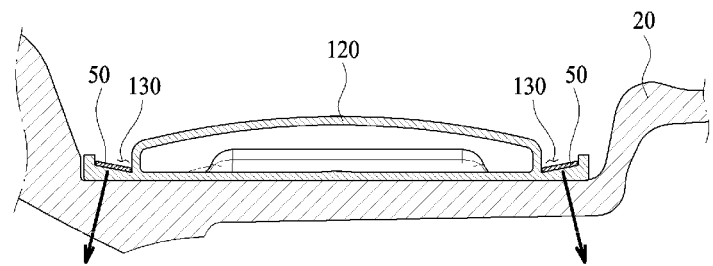

FIGS. 3, 4A and 4B are a detailed view and a cross-sectional view of a first fastening groove according to an embodiment of the present disclosure.

The fastening way between the resonance module 100 and the rim 20 of the automotive wheel according to an embodiment of the present disclosure may be classified into two types.

A fixing portion (not shown) protruding from a side of the resonance module 100 may be inserted in a fixing groove (not shown) that has a shape corresponding to the shape of the fixing portion to be able to accommodate the fixing portion and is disposed at a side of the rim 20, whereby the resonance module 100 and the rim 20 may be primarily coupled and fixed.

Further, the resonance module 100 and the rim 20 may be secondarily coupled and fixed by a first accommodation groove 130 and a second accommodation groove 140 that accommodate a fastening band 50 pressing down the resonance module 100 toward the rim 20 other than the fixing portion and the fixing groove of the automotive wheel according to an embodiment of the present disclosure.

In more detail, the resonance module 100 may include a first accommodation groove 130 spaced a predetermined distance inward from both sides of the resonance module 100 and being able to accommodate a fastening band therein that is an additional fastening component between the rim 20 and the resonance module 100 so that the fastening force between the rim 20 and the resonance module 100 can be improved.

In addition, the resonance module 100 may include a second accommodation groove 140 engraved from the bottom of the first accommodation groove 130 to be able to accommodate a stopper 51 of the fastening band 50.

The fastening band 50 may be other well-known members such as a metal cable tie, but is not limited thereto.

A tying portion that is the string of a cable tie that is an additional fastening component may be inserted in the first accommodation groove 130 formed on a side of the resonance module 100 and a body portion for adjusting the length of the tying portion of the cable tie may be inserted in the second accommodation groove 140.

As a result, since the rim 20 and the resonance module 100 are coupled by the fixing groove (not shown) and the fixing portion and the fastening band 50 presses down the resonance module 100, thereby additionally providing a fastening components for the rim 20 in the automotive wheel according to an embodiment of the present disclosure. Accordingly, when the bottom of the resonance space is open and directly exposed to the surface of the rim 20, the effect of offsetting a resonance sound may be deteriorated because the resonance module 100 comes off the rim 20 de to wind pressure that is generated when the automotive wheel is rotated, but the present disclosure can prevent this phenomenon because there is the rim contact portion.

In addition, in this embodiment, the rim contact portion and the resonance portion 120 of the resonance module 100 may be integrally made of a fiber material. Therefore, according to the present disclosure, it is possible to reduce the weight in comparison to plastic or metal materials such as aluminum and it is also possible to minimize the manufacturing cost.

Meanwhile, the bottom of the first accommodation groove 130 may have a flat surface, as shown in FIG. 4a, and the height of the bottom of the accommodation groove 130 may gradually increase outward from the inside so that the fastening force between the resonance module 100 and the rim 20 can be improved, as shown in FIG. 4b. In more detail, the fastening band 50 inserted in the first accommodation groove 130 having a flat width pressed vertically down the resonance module 100, whereas the fastening band 50 inserted in the first accommodation groove 130 of which the height gradually increases outward from the inside can press the resonance module 100 outward at an angle with respect to the vertical direction. As a result, since the fastening band 50 presses down the resonance module 100 at an angle outward, the resonance module 100 can be maintained in a tensed state, so the resonance module 100 and the rim 20 can be more stably coupled and fixed.

Figure 5:
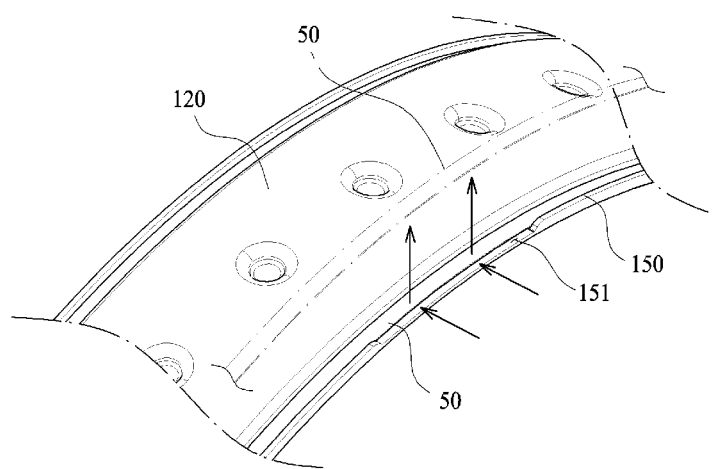
FIG. 5 is a detailed view of an anti-separation guider according to the present disclosure.

FIG. 5 is a detailed view of an anti-separation guider 150 according to the present disclosure.

The resonance module 100 may include anti-separation guiders 150 and a spacer 151.

The anti-separation guiders 150 may be disposed between both sides of the resonance module 100 and the first accommodation groove 130 and may protrude from the top of the resonance module 100 to be able to prevent the fastening band 50 from separating from the resonance module 100.

Further, the anti-separation guiders 150 may include an anti-rotation guider (not shown) protruding toward the inside of the resonance module 100 from the inner side of the anti-separation guider 150 to be able to prevent the fastening band from rotating when the wheel is rotated.

As a result, since the fastening band 50 can be more stably fixed to the resonance module 100, the fastening force between the rim 20 and the resonance module 100 can be increased.

In addition, at least any one of the anti-separation guiders 150 disposed on both sides of the resonance module 100 may include a spacer 151 that provides a space, which enables the fastening band 50 inserted in the first accommodation groove 130 to be taken out and replaced, by securing a spare space.

Accordingly, when the length of the fastening band 50 is larger or smaller than the diameter of the wheel on which the fastening band 50 is mounted, it is possible to decouple the fastening band 50, adjust the length of the fastening band 50, and then insert the fastening band 50 back into the resonance module 100 with the fastening length adjusted.

The above description merely explains the spirit of the present disclosure and the present disclosure may be changed and modified in various ways without departing from the spirit of the present disclosure by those skilled in the art.

Accordingly, the embodiments described herein are provided merely not to limit, but to explain the spirit of the present disclosure, and the spirit of the present disclosure is not limited by the embodiments.

The protection range of the present disclosure should be construed on the basis of claims and all spirits that are considered as being same or equivalent to the protection range should be construed as being included in the right range of the present disclosure.

What is claimed is:

1. An automotive wheel equipped with resonator module having improved fastening force, the automotive wheel comprising:

a spoke including an edge and a plurality of supports radially extending from a center thereof to the edge;

a rim connected to the edge of the spoke; and a resonance module including a rim contact portion provided to surround an outer edge of the rim, and a resonance portion formed to surround at least a portion of the rim contact portion and forming a resonance space between the rim contact portion and the resonance portion, wherein the resonance module includes a first accommodation groove spaced a predetermined distance inward from both sides of the resonance module and being able to accommodate a fastening band therein so that a fastening force between the rim and the resonance module can be primarily improved, wherein the resonance module further includes anti-separation guiders disposed between both sides of the resonance module and the first accommodation groove and protruding from a top of the resonance module to be able to prevent the fastening band from separating from the resonance module, and wherein at least any one of the anti-separation guiders disposed on both sides of the resonance module includes a spacer that provides a space, which enables the fastening band inserted in the first accommodation groove to be taken out and replaced, by securing a spare space.

2. The automotive wheel of claim 1, wherein the resonance module includes a second accommodation groove engraved from a bottom of the first accommodation groove to be able to accommodate a stopper of the fastening band.

3. The automotive wheel of claim 2, wherein the height of the first accommodation groove gradually increases outward from the inside thereof so that the fastening band presses down the resonance module outward, thereby being able to secondarily improve the fastening force between the resonance module and the rim.

4. The automotive wheel of claim 2, wherein the spacer and the second accommodation groove are continuously disposed on the same line on the width-directional axis of the resonance module.

5. The automotive wheel of claim 1, comprising a light-weight portion bored on a side of the resonance module to reduce the weight of the resonance module.

6. The automotive wheel of claim 1, comprising a coupling portion disposed at an end of the resonance module so that a plurality of resonance modules can be coupled and fixed.

7. The automotive wheel of claim 6, wherein any one of ultrasonic melding, thermal melting, or vibration melting is selectively performed on the coupling portion after two or more resonance modules are coupled.

* * * * *